July 11, 1972 SABURO SHIMOI 3,676,018
PUMPING APPARATUS
Original Filed Nov. 25, 1968 10 Sheets-Sheet 5

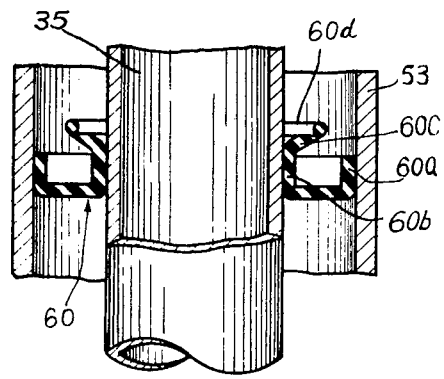
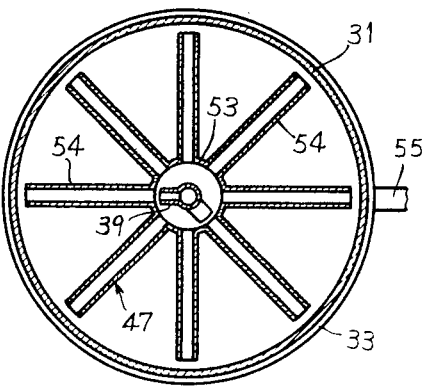
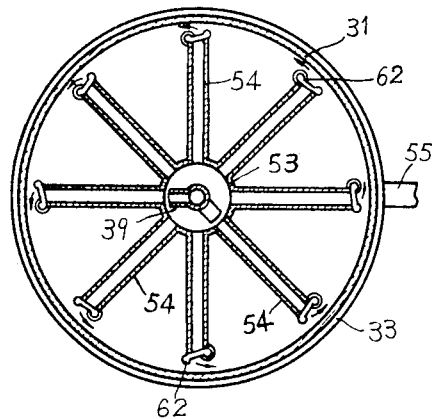
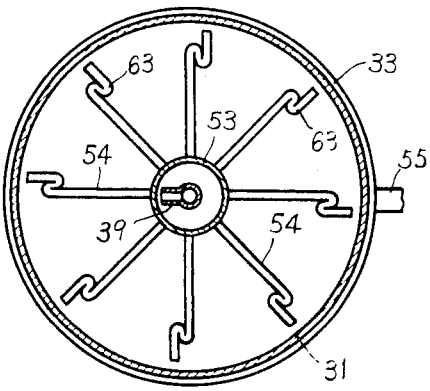
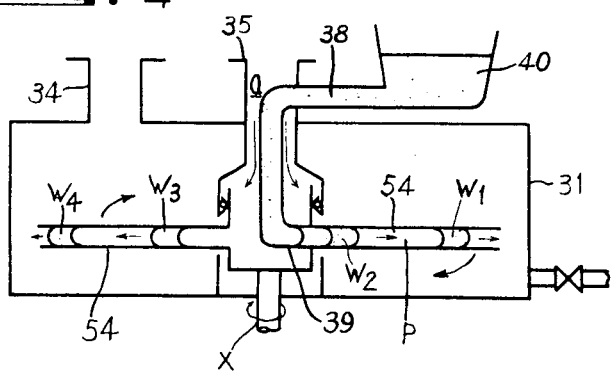

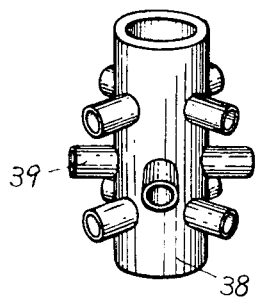
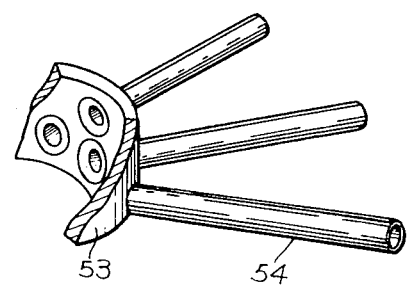
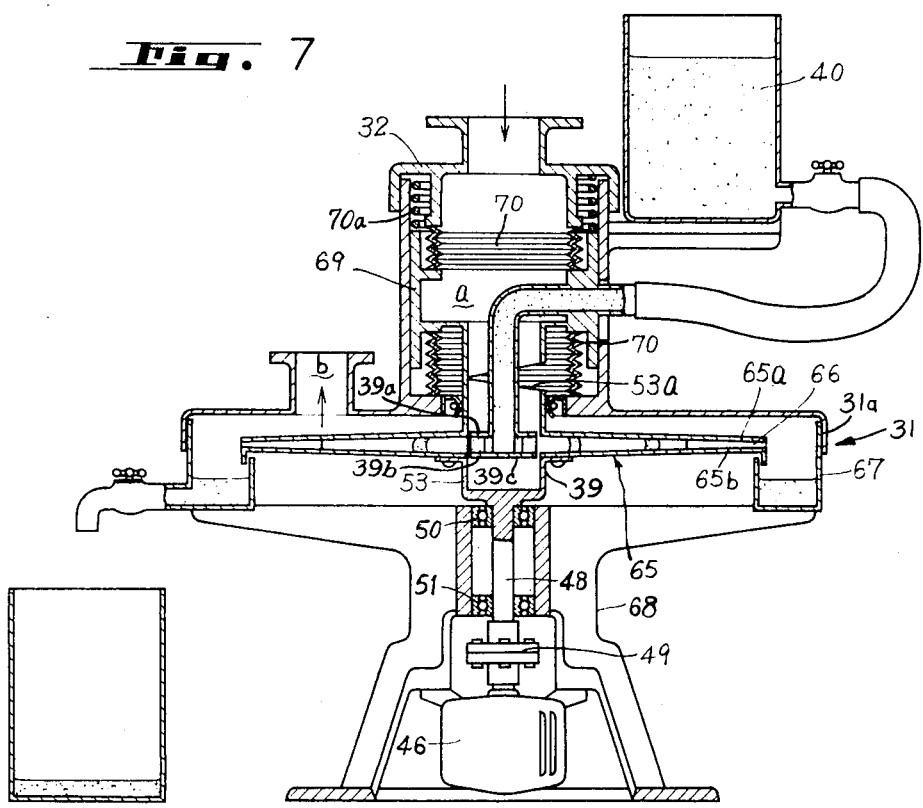

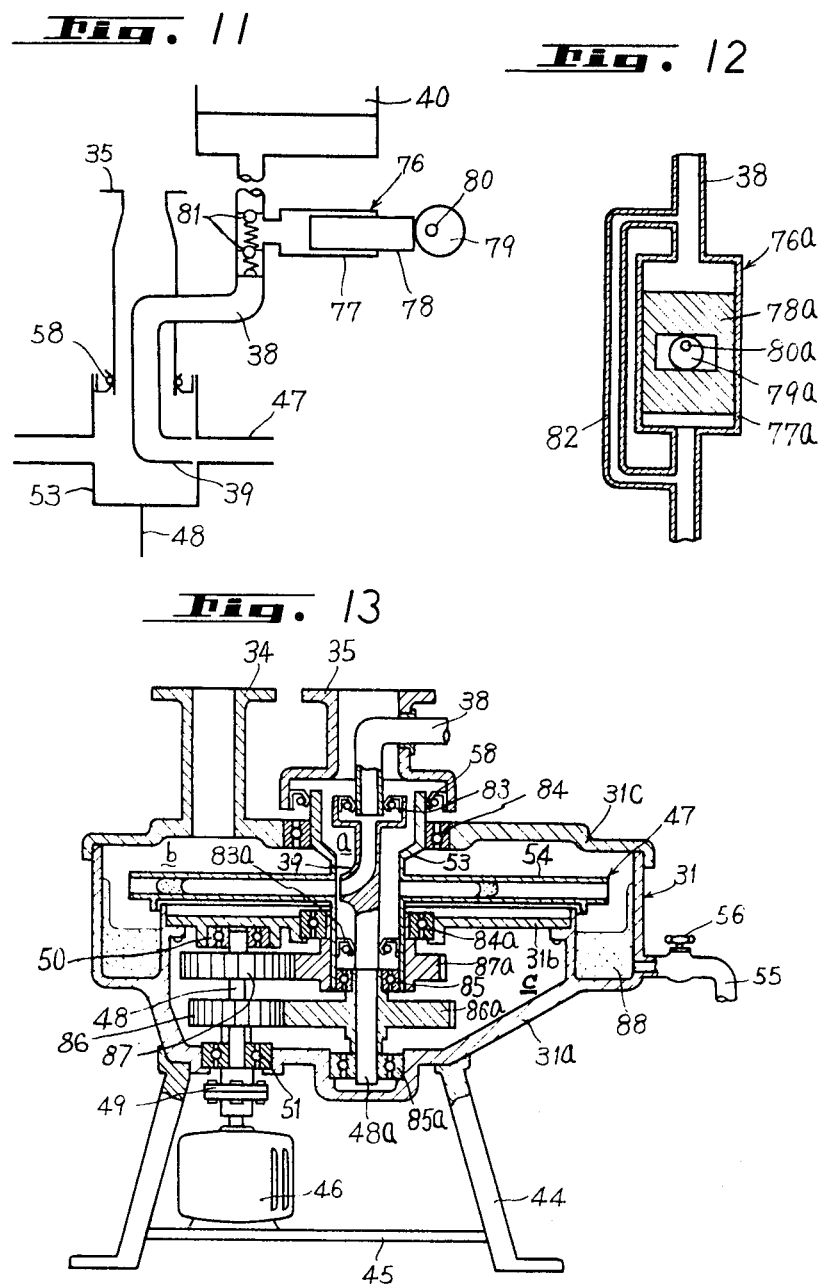

United States Patent Office 3,676,018
Patented July 11, 1972

3,676,018
PUMPING APPARATUS
Saburo Shimoi, Kyoto, Japan, assignor to Shimadzu Seisakusho, Ltd., Kyoto, Japan
Original application Nov. 25, 1968, Ser. No. 778,539, now Patent No. 3,584,978. Divided and this application June 12, 1970, Ser. No. 57,864
Int. Cl. F04f *11/00*
U.S. Cl. 417—72                                                5 Claims

ABSTRACT OF THE DISCLOSURE

A pumping apparatus includes a radially extending rotary fluid passage member within a pumping casing. The rotary fluid passage member is communicated with low pressure side within the casing through its inlet end and with high pressure side within the casing through its outlet end. Liquid is intermittently supplied into the fluid passage member through the inlet end to form liquid partitions within the fluid passage member. The liquid partitions are driven radially outwardly through the fluid passage member under the centrifugal force produced by the rotation of the fluid passage member so as to positively transfer the fluid in the low pressure side through the passage member into the high pressure side, thus effecting pumping action.

---

This application is a divisional of my co-pending application Ser. No. 778,539, filed Nov. 25, 1968, now Pat. No. 3,584,978.

BACKGROUND OF THE INVENTION

This invention relates to pumping means useful for effecting such operations as suction, exhaustion, conveyance or compression on fluid such as air and liquid. More particularly, this invention relates to a new and improved mechanical pumping apparatus which carries out pumping action on an unprecedented principle wherein fluid to be treated is separated into a high pressure portion and a low pressure portion by liquid partitions which are caused to move under the effect of a centrifugal force produced by mechanical rotation for transferring said fluid toward a desired location.

Various pumping devices normally in use at present can be classified into two major types; those which accomplish a forced transfer of fluid to be dealt with by mechanical means and those by physical or chemical means. The present invention provides a pumping apparatus which belongs essentially to the mechanical type according to the above classification and possesses substantially superior pumping capability over the conventional pumping devices of the type. Among the mechanical type vacuum pumps, displacement pumps in which pumping action is performed by the rotation or reciprocation of pumping means or vanes and molecular pumps which have been recently developed into practical use are two important ones. Those conventional pumping devices of mechanical nature, however, are accompanied by the following inherent disadvantages.

First, they have various mechanical friction parts which generate heat and require additional lubricating systems, thus restricting the range of application in which they can be possibly employed. Heat generation and the need of adequate lubrication become critical limitations on suitability especially with respect to vane-type pumping devices and rotary oil pumps. In vacuum pumps, when lubricating oil is required for the lubrication of the frictional parts, the maximum vacuum density which can be created will be greatly restricted by the level of pressure at which the lubricating oil becomes vaporized.

Secondly, the conventional mechanical type pumping devices with frictional parts therein cannot escape a large amount of power loss resulting from power-consuming frictional engagement or contact in those parts. Prior art water pumps have the further disadvantage in that mechanical engagement between liquid and solid parts as well as liquid-to-liquid collision tend to cause additional power loss. As will be readily understood, power loss in a pumping device inevitably leads to a substantial decrease in pumping efficiency.

Thirdly, as is the case with all types of conventional pumping devices, mechanical type pumping apparatus shows only a poor volume efficiency during the exhaustion or compression cycle. For example, in vane-type pumping devices, a complete elimination of fluid leakage through solid-to-solid contacts between movable fluid carrying vanes and a stationary frame member is virtually impossible and the fluid leakage therethrough is increased during compression of the fluid to be treated. In the case of so-called water-tight pumping apparatus, splashing and suspension of the water due to the agitation imparted thereto during operation brings about a reduced volume efficiency. None of the conventional pumping devices has been successful in transferring the entire fluid introduced from an inlet towards an outlet without causing a substantial drop-out thereof and such an ideal pumping apparatus has not been found prior to the present invention.

Various attempts have been made with respect to the conventional pumping devices for overcoming the above mentioned drawbacks inherent therein but all these attempts were of minor importance and scope as well and basic and far-reaching solutions to those problems are deemed necessary for the benefit of the entire pump manufacturing industry. It is therefore highly desirable to provide a new and improved pumping device which completely eliminates above described shortcomings.

An object of the present invention is to provide a new and improved pumping apparatus of higher volume efficiency wherein fluid to be dealt with is successively divided in the region of a pump entrance into a high and a low pressure portion by liquid partitions which are caused to positively move one of said portions of fluid towards a pump outlet under a centrifugal force.

A further object of the present invention is to provide a new and improved pumping apparatus of a construction which substantially eliminates wearing-out and heat-generation therein as well as the need for lubrication in indispensible mechanical contacting portions and which is capable of enduring various physical and chemical conditions including corrosive action giving it a lasting, high-efficiency-performance in diverse applications.

Another object of the present invention is to provide a new and improved pumping apparatus of increased pumping efficiency having substantially no mechanical friction parts therein which minimizes the necessary driving power as well as reducing the power loss thereof.

SUMMARY OF THE INVENTION

In accordance with one preferred embodiment of the present invention, the new and improved pumping apparatus comprises a casing which defines a high pressure chamber and a low pressure chamber therein. The casing is provided with an inlet port communicating with the low pressure portion and an outlet port communicating with the high pressure portion. A rotary fluid passage means having at least one radially extending fluid passageway is positioned within the casing member for rotation on its axis and is communicated with the low pressure portion through its inlet end and with the high pressure portion through its outer end. The pumping apparatus further includes a liquid supply or injection member for intermittently introducing liquid into the rotating passageway through its inner end. The liquid supplied into the rotating passageway forms at least one partition therein which serves to separate the fluid within said passageway into at least two sections. The liquid partition formed within the radial passage is driven radially outwardly through the passage from the inlet end towards the outlet end under the influence of a centrifugal force created by the rotational movement of the passage assembly during which the liquid partition carries together the portion of fluid existing upstream of the liquid partition in the direction of its movement. With the subsequent supply of liquid into the rotating passage, therefore, the subsequent formation of liquid partitions within the passage, the fluid including air, gas or water, vapor within the low pressure portion is positively transferred through the radial passage into the high pressure portion, thus effecting efficient pumping operation.

BRIEF DESCRIPTION OF THE INVENTION

The invention both as to organization and method of operation, may be understood by reference to the following description taken in conjunction with the accompanying drawings.

In the drawings:

FIG. 2A is a fragmentary sectional view in an enlarged size showing the sealing device interposed between the inlet pipe member and the rotary frame member for fluid-tightly closing the annular gap therebetween in such manner as to permit the rotation of the rotary frame with respect to the inlet pipe:

FIG. 3 is a horizontal sectional view generally taken along lines 3—3, showing in detail the radial arrangement of the passage assembly;

FIG. 3A is a sectional view similar to FIG. 3 in which each radial passage means is shown provided at its outer end with a suitable check valve;

FIG. 3B is a sectional view similar to FIG. 3 in which each radial passage means is shown formed with a trap portion in the vicinity of its outer end;

FIG. 4 is a diagrammatically illustrated sectional view of the pumping apparatus of FIGS. 1 through 3 showing the working principle of this invention;

FIG. 5 is a perspective view of the nozzle member incorporated in the pumping apparatus of FIGS. 1 through 3 for intermittently supplying liquid into the rotary fluid passage member;

FIG. 6 is a fragmentary perspective view of the rotary fluid passage assembly of the pumping apparatus showing the manner in which a plurality of radial passage means are mounted on the rotary frame member;

FIG. 7 is a sectional view of a pumping apparatus embodying another form of this invention in which a radial passage body is constructed of a pair of circular plates disposed in spaced relation with respect to each other and a liquid supply nozzle adapted to reciprocate along the longitudinal axis thereof;

FIG. 3 is a horizontal sectional view showing the modified form of radially extending fluid passage means;

FIG. 11 is a diagrammatic view of a pulsating device which can be selectively employed in the pumping devices of the present invention for imparting pulsating motion to the liquid passing through a supply line;

FIG. 12 is a diagrammatic sectional view of another pulsating device;

FIG. 13 is a sectional view of a pumping apparatus embodying a further form of this invention in which the liquid supply nozzle is adapted to rotate on its axis with respect to the rotary fluid passage assembly;

In the following explanation and descriptions of various embodiments according to the present invention, like components are illustrated by like reference numerals through all embodiments.

DESCRIPTION OF THE PREFERRED EMBODIMENT

Figure 1:
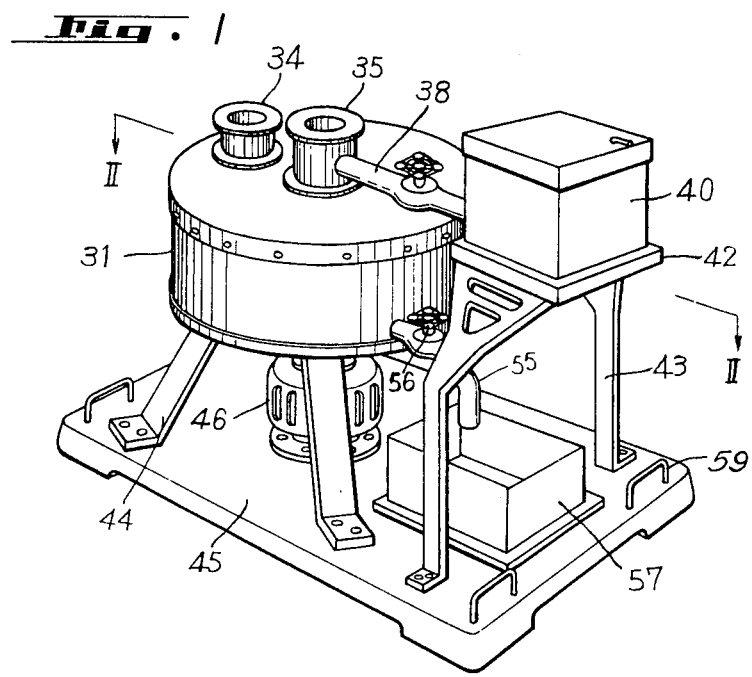
FIG. 1 is a perspective view of a pumping apparatus embodying one principal form of this invention.
Figure 2:
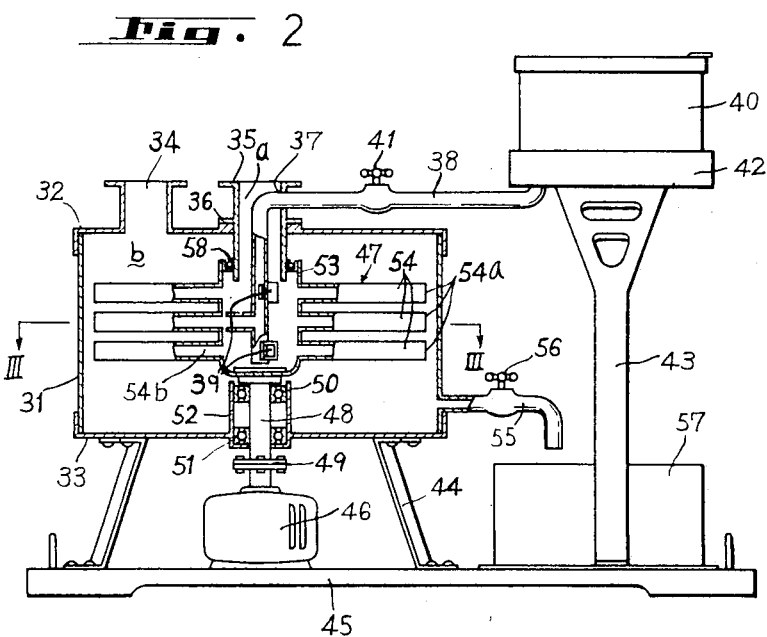
FIG. 2 is a vertical sectional view generally taken along line 2—2 of FIG. 1.

Turning now specifically to the accompanying drawings, and in particular to FIGS. 1 through 3 inclusive, there is illustrated a pumping apparatus embodying one preferred form of this invention. FIG. 7 shows in perspective view of the pumping apparatus of the present invention in which the reference numeral 31 designates a casing thereof which comprises an open ended cylindrical member covered or shielded at its both ends with a top cover plate 32 and a bottom plate 33 defining therein a pumping chamber or room $b$. The top cover plate is integrally provided with an upwardly extending outlet or exhaust tube 34. An inlet or suction tube 35 is fixedly supported on a flange 36 formed circumferentially around a center opening of the top plate so as to extend upwardly therefrom and downwardly through the center opening into the pump room. The portion of the inlet pipe 35 projecting upwardly out of the pump room has a side hole 37 to receive therein a liquid supply tube or pipe 38 extending into pump chamber b. The supply pipe penetrating into the pump room is provided at the lower end portion thereof with a plurality of fluid supply nozzles 39 and is connected to a storage tank 40 at its other end through a suitable flow controller 41 such as a flow control valve for controlling the flow of liquid therethrough. The liquid tank may be preferably supported in a lifted position with respect to the nozzle end of the supply pipe by means of a support plate 42 at the top of a support column 43 to thereby produce the desired flow of liquid. A plurality of frames or brackets 44 bolted on a base 45 support the casing 31 in a horizontal position below the level of the liquid tank. A motor 46 is fixedly mounted on the base member and is connected in driving relation to a rotary fluid pipe assembly generally indicated by numeral 47 through a suitable torque transmitting mechanism. In the illustrated embodiment of the present invention, the torque transmitting mechanism includes a connecting shaft 48 operatively joined to the output shaft of the motor by a coupling 49. The connecting shaft is rotatably supported by a pair of bearings 50, 51 within a bearing housing 52 of which will be more fully discussed hereinafter. A rotary frame member 43 with a plurality of radially extending fluid passage means 54 mounted thereon is secured to the upper end of the connecting shaft 43 for rotation with said shaft. With the above arrangement, rotation of the motor 46, more specifically of the output shaft thereof, is transmitted through the coupling 49, the intermediate shaft 48 and the rotating frame member 53 to the fluid passage assembly 47 resulting in the rotational movement thereof. As described hereinafter in more detail, fluid which passes through the radial passage means or pipes 54 flows out through their outlet openings 54a onto the bottom of the pump casing 31. To prevent this discharged fluid from entering the bearing section rotatably supporting the connecting shaft 43, the bottom cover plate 33 is integrally provided with a bearing housing 52 for accommodating bearing members 50, 51 therein in a liquid free manner. Further, if the pump casing becomes filled with the thrown-out fluid, proper bearing function of the members 50, 51 will be obstructed and no satisfactory pumping action of the whole apparatus results. In order to avoid these inconveniences, as clearly shown in FIG. 2, a suitable discharge tube 55 is connected to the casing 31 at the lower portion thereof adjacent the bottom plate 33 for the withdrawal of the liquid stored in the pump casing. The discharge tube having a suitable valve means 56 therein extends onto a receptacle 57 positioned on the base 45 and directs the sump fluid into the receptacle.

As illustrated in FIGS. 2 and 3, a plurality of relatively long pipe means 54 are arranged in three radial arrays or stages and mounted at their inner ends 54b on the rotary frame member 53 to form a rotating fluid pipe assembly 47. In the exemplified embodiment, every array includes eight radially extending pipes 54 spaced from each other by a predetermined equal angular distance around the rotating frame and arranged in a horizontal plane. In addition, each horizontal array of pipes is displaced vertically or axially a predetermined distance from the adjacent arrays of pipes along the frame 53.

These tubes 54 extend radially outwardly from the frame member with outer ends thereof reaching close to the inner surface or wall of the pump casing 31. Further, each radial of the fluid pipes has a predetermined radial length selected in close connection with the rotational speed of the pipe assembly 47 and the cycle of fluid supply thereinto which forms partitions or films within each radial passage as will be discussed more fully hereinafter. As shown in FIGS. 2 and 3, nozzles 39 for ejecting fluid fed from the tank 40 through supply pipe 38 into radial passage means 47 are mounted vertically onto the lower end portion of the supply pipe 33 in three stages or arrays, each array including, for example, three nozzle pipes angularly spaced apart from each other by 120 mechanical degrees so as to assure effective intermittent fluid injections into radially extending fluid pipes 54 arranged vertically in three stages or arrays around the rotary frame to form a rotary pipe assembly 47. The number of injection nozzles 39 is dependent partly on the number and length of radial pipes 54 included in the assembly due to the fact that, for the satisfactory operation of the pumping apparatus of this invention, partitioning fluid or liquid must be intermittently introduced into the radial passage in order to effectively separate the fluid to be handled i.e. either exhausted or compressed at least one point within every passage or pipe 54.

If it is desired to use the device of the present invention as a vacuum pump or an exhaust system, a portion to be exhausted is connected to the inlet port 35, and as a compressor a portion to be compressed is joined to the outlet port 34. Partitioning fluid which will be injected into the radial pipes should be of liquid nature such as for example, oil, mercury, water to mention the few. When using the present apparatus as a pumping plant for exhausting vapor, oil may preferably be used as a partitioning liquid.

The particular embodiment shown in FIGS.1 through 3 is especially suitable for use as a vacuum pump. Therefore, the operation of the present apparatus referred to as a vacuum pump is now explained in general.

During operation of the vacuum pump, as exhaustion proceeds, pressure within the pump casing 31 decreases causing fluid employed as a partitioning means in accordance with the present invention, for drawing out air, water vapor or the like tends to vaporize. Such vaporization of the partitioning fluid or liquid at lower pressure atmosphere within the pump room deteriorates the pumping action of the whole device and should conveniently be avoided. In order to meet above mentioned requirement, partitioning fluid may be preferably selected from among those liquids which tend to vaporize at lower pressures. In this respect, oil is preferred for use as a partitioning liquid in the present apparatus and the storage tank 40, in the particular embodiment shown, is filled with oil, However, it would be readily understood that, as will be described hereinbelow, fluids other than oil can also be utilized to function as a partitioning substance in accordance with the present invention. In fact, for example, in carrying out voluminous exhaustion by the pumping plant of the invention wherein a vacuum density requirement is not especially critical, water main from water service may be connected to the liquid tank or reservoir 40 to supply a large quantity of water needed for effecting a greater amount of exhaustion to the pumping apparatus.

In the following disclosure, operation of the pumping device embodying the principal form of the present embodiment shown in FIGS. 1 to 3 will be discussed in more detail, wherein for the purpose of explanation and description liquid used as a partitioning member may be referred to as oil. Pumping action of this pumping plant initiates upon rotation of the driving motor 46. The rotation of the motor is transferred through coupling 49 drive shaft 48 and rotary frame member 53 to the fluid pipe assembly 47 causing high speed rotation of radially extending fluid pipes 54 on the longitudinal axis of the support frame. Liquid injection nozzles 39 are shown in close proximity to the radial inner ends 54b of the fluid pipes but are in fact out of contact therewith. Similarly, the radial outer ends 54a of the fluid pipes are disposed adjacent to the inner surrounding wall of the casing 31 but are out of engagement therewith. Thus, being free from mechanical friction, fluid pipe assembly 47 rotates without interference when the driven by the motor. The control valve 56 connected within the sump exhaust pipe 55 is first opened after which the control valve 41 in the supply pipe 38 is similarly opened to allow the passage of supply oil from the tank 40 through the pipe 38 to the nozzles 39 atached to the lower end portion of the feed pipe, which in turn injects oil radially into any of the rotating pipes 54 through inlet openings 54b. As pointed out above, the pipe assembly 47 is driven at a predetermined high speed of rotation by the motor 46 mounted on the base member. When a certain amount of oil injected from the nozzles enters into the radial fluid pipes or passages 54, it is forced radially outwardly therethrough under the influence of centrifugal force produced by the rotation of the pipe assembly 47 dividing the space within each fluid pipe into two portions i.e. a high pressure portion and a low pressure portion. In this connection, it is noted that the amount of oil moving radially outwardly from the inlet toward the outlet through each passage within fluid supply tubes 54 serves as a partitioning member which divides said passage into two parts of different pressure. Another quantity of oil is subsequently supplied from the supply nozzles 39 into the radial tubes 54 through their inlet ends 54b while at least one drop of oil previously injected exists or remains in the radial fluid pipe forming at least one liquid partition therein. As the result of this positive radial transfer of oil together with the fluid to be handled outwardly from the inlet ends toward the outlet ends through the fluid pipes, lower pressure space within those pipes 54 will increase or stretch out gradually taking in gaseous or vaporous bodies such as air thereinto. In this way, air is drawn from the inlet chamber a, defined by the inlet pipe 35 through a plurality of radial tubes 54 into the pump room b thereby letting out air in the portion connected to the inlet pipe for exhaustion thereof and vacuum is created within said portion. Exhaust air from the outlet ends 54a of the pipes 54 into the pump room b and passes through the outlet pipe 34 out of said room. The partitioning oil employed for transferring air radially through the fluid pipes 54 flows out of the outer ends thereof against the inner wall of the pump casing 31, downwardly therealong onto the bottom of the casing and from the through discharge pipe 55 into the sump bin 57. As the manner in which the pumping device of the present invention operates has been described above the working principle thereof is now explained in more detail referring particularly to FIG. 4 of the drawings which shows diagrammatically the essential components in the construction of the apparatus. In FIG. 4, like components are illustrated by like reference numerals to those employed in FIGS. 1 through 3. For simplicity and ease of explanation only one of three stages of horizontal tubing arrays is illustrated with one nozzle opening in the drawing. During rotation of the pipe assembly 47 at predetermined speed, the liquid contained in the tank 40 flows through supply tube 38, and is injected by the fixed nozzle 39 into the radial pipes 54 through the inner entrance. FIG. 4 shows the pumping apparatus of the invention right after a quantity partitioning liquid W1 has been supplied from the stationary nozzle into the radially extending pipe 54 of the array which is in radial and horizontal alignment with the nozzle. With the supply of liquid into the pipe which forms a liquid partition, there is defined a compartment or bucket between the liquid partition W2 and the drop of liquid W1 previously introduced thereinto forming another partition. Liquid partitions W1, W2 defining a bucket P therebetween moves and transfer the air confined in the bucket radially outwardly to the right as viewed in FIG. 4 through the pipe 54 under the influence of centrifugal force exerted thereto by rotational movement of the pipe assembly. As the liquid partition W2 is forced radially outwardly to the right, a certain degree of vacuum condition is produced within inlet chamber a resulting in the suction of additional air through the inlet pipe into the radial pipe. When the radial pipe is rotated 360° on the axis and is brought again in radial alignment with the stationary nozzle, supply of still another quantity of partitioning liquid (not shown) into the pipe takes place to define additional air compartment or bucket together with preceding liquid partition W2 within the said pipe and the air or gas entrapped within said bucket is discharged out into the pump room as the result of the radially outward movement of the liquid partitions through the pipe imparted by centrifugal force acting thereon in similar manner pointed out above. This cycle of operation is repeated each time the pipe on the right comes into radial alignment with the nozzle during its rotation about the axis. The same cycle of operation occurs with respect to another pipe shown on the left each time it is brought into radial alignment with the nozzle during rotation thereof. In FIG. 4 the radial pipe on the left is shown with the drops of partitioning liquid driven radially outwardly therethrough slightly further than those in the pipe on the right. Pumping action is accomplished as the result of the combined effect of the above mentioned cycle of operation and depending upon the substance desired to be treated, gaseous or vaporous body such as air, water vapor is drawn out as indicated by arrows in the drawings.

In the construction of the pumping apparatus of the present invention leakage-proof connection or engagement should preferably be maintained between the lower end portion of the fixed inlet tube 35 and the upper end portion of the rotating frame member 53 which supports the radial pipe assembly to form an air-tight arrangement. In the particular embodiment shown in FIGS. 1, 2, 3 so called oil seal 58 of simple and rigid construction is positioned between the outer surface of the inlet tubing 35 and the inner surface of the rotary frame 53 at their lower and upper ends respectively to air-tightly close the annular gap therebetween while permitting rotation of the frame member with respect to the inlet pipe. However, other sealing devices such as, for example, a water tight packing or a labyrinth packing may suitably be used for this sealing purpose. As shown in FIGS. 1 and 2 handles 59 affixed to the base member 45 provide convenient carrying means in transporting the apparatus.

In FIG. 2A there is shown in enlarged size one preferred embodiment of a sealing device which can suitably be incorporated in the present apparatus for accomplishing the above purpose. As shown in the drawing, an annular sealing member 60 being formed of elastic material such as rubber and having a hook-shaped cross-section is disposed between the rotary frame 53 and the fixed fluid pipe 35. More specifically, the sealing member includes a base portion 60a secured to the rotating frame 53, a bight portion 60b closely contacting with the outer surface of the pipe 35 and a free end portion 60c having a weight portion 60d formed integrally therewith, the end portion being positioned radially outwardly away from the pipe 35.

With this structure, when the rotating frame member is at a standstill the bight portion 60b of the sealing rubber 60 maintains close pressure contact with the outer surface of the tube 35. As the frame rotates with increasing speed, the weight part 60d of the sealing member tends to extend radially outwardly under the effect of centrifugal force acting thereon, thus decreasing contact pressure of the sealing member and the pipe. However, contact pressure of the member 60 against the pipe 35 is selected in connection with the rotational speed of the frame member 53 such that the bight portion 60b does not disengage from the outer wall of the tube 35 during rotation of the frame at normal operational speed. In the drawing, the sealing member is shown as having generally the shape of a rectangular hook in its radial cross section for the mere purpose of illustration without necessary limiting the shape and form of the sealing device to the example shown. Further, the weight part 60d of the sealing member may either be made of the same material used in forming other portions of said member or be made of different material from that forming the rest of the member. With above arrangement of the sealing device, during rotational movement of the frame, contact pressure between the fluid tube 35 and the bight portion 60b of the sealing member decreases considerably to reduce the mechanical friction therebetween with the bight portion 60d being still in close contact with the pipe 35 maintaining the desired sealing function against leakage.

Another important component to which special attention should be given in designing the present apparatus is nozzle member for supplying liquid into a plurality of radially extending fluid pipes of the assembly 47. It is of utmost necessity to position injection nozzles 39 and fluid pipes 54 with close radial tolerance therebetween since a direct engagement or sliding contact of the nozzles with the inner ends of the pipes must be avoided for smooth, free rotation of the pipe assembly on the one hand and a wide radial gap between the nozzles and the inner ends of the pipes should also be avoided in order to prevent the undesirable escape of liquid therefrom onto the bottom of the support frame. Preferable constructions of the nozzles as well as the radial pipes together with a support frame are illustrated in FIGS. 5 and 6. In FIG. 5, a plurality of radially extending nozzles 39 are mounted radially on the lower end portion of the supply pipe 38 in three stages or sets of horizontal arrays displaced from one another in the direction of its longitudinal axis. Each array includes four nozzles angularly spaced by 120° from each other and each nozzle 39 in every array is positioned in such angular relation with respect to the corresponding nozzles in other arrays that it is angularly displaced 45° therefrom. The nozzles should preferably be configured in a arc at their radial outer ends in comformity to the inner surrounding wall of the rotary frame member as shown in FIG. 3. It will be apparent to those skilled in the art that the shape of the nozzle opening must carefully be selected in accordance with the shape of the inlet opennig of the pipes 54 for easy transfer of liquid. FIG. 6 illustrates the manner in which radial pipes 54 are mounted on the rotary frame member 53. These pipes may either be welded onto or threaded into the member.

The new pumping apparatus embodying a principal form of this invention has the following unprecedended advantages. In the present pumping apparatus exhausting or compressing operation depending upon the desired use thereof is carried out by confining fluid to be treated i.e. to either be exhausted or compressed within the space defined by films or partition of liquid and positively transferring said fluid radially outwardly by liquid partitions under the influence of centrifugal force. Therefore, the main pumping section of the apparatus has no sliding parts whatsoever and it is not necessary to consider the lubricating property of the partitioning liquid as was the case with prior art pumping plants having sliding parts in the section which undertakes pumping duties. In this respect, it should be noted that the pumping apparatus of the present invention enjoys the remarkable advantages in that it has a wide variety of liquids suitable for use as a partitioning member. For example, when a corrosive gas is to be treated by the apparatus, it is possible to use a liquid that would not be affected by its corrosive action or a liquid which counteracts corrosiveness of the gas. Thus partitioning liquids can be chosen with respect to the gas to be treated. Further, in case the substance or fluid to be handled by the apparatus of the invention is water vapor, water may possibly be employed as a suitable partitioning liquid due to the fact the present apparatus needs no lubricant in its essential pumping mechanism. It is self-evident that in choosing partitioning liquids for use in the apparatus the pressure at which those liquids vaporize should also be considered for the reason disclosed above. In this respect the present invention make it possible to utilize a liquid having lower vaporizing pressure with the result being high degree of vacuum achieved by the apparatus. In actual application where the apparatus of this invention operates as a vacuum pump, approximately $10^{-5}$ mm. Hg of vacuum has readily been obtained using diffusion pump oil to serve as the partitioning liquid. Further, the present apparatus works with relatively small driving power due to the following facts: the apparatus has no friction parts, less agitation of liquid occurs in the apparatus during its operation as compared with conventional water tight pumps, the apparatus eliminates the inspiration and compression strokes of the conventional pumping devices and instead causes only forced transfer of liquid partitions through the radial passages to perform pumping action thereof. In addition, the pumping apparatus in accordance with the present invention effects complete positive transfer or conveyance of fluid to be treated in its pumping action which results in extremely high volume efficiency.

Among other notable advantages of the present apparatus are, little heat is produced in the pumping mechanism of the apparatus during operation thereof; the partitioning liquid serves also as a cooling agent, the apparatus cause no smoke during operation, has dust proof construction, creats less noise and vibration, is capable of handling various liquids and is easy in starting operation.

In FIG. 3A there is shown another preferred embodiment of the radially extending fluid pipe assembly 47. The illustrated exemplification has been made to prevent back flow of the fluid to be treated from the pump room b back into the radial pipes 54 through their opened outer ends while the pumping device is at a standstill without necessarily disturbing pumping action thereof during operation. For this purpose each radial pipe of the assembly 47 has a check valve 62 mounted thereon at the radial outer end. The check valves are so constructed that they normally close the openings at the radial outer ends of the pipes while the pipe assembly remains stationary and moves as indicated by arrows to open said openings under the effect of centrifugal force as the assembly is rotated at the predetermined operational speed. FIG. 3B shows still another embodiment of the pipe assembly. In this embodiment each radial pipe 54 of the assembly 47 is bent on itself twice in radial direction to form a generally S-shaped trap portion in the vicinity of the outer end 54a thereof. As mentioned above, for the satisfactory pumping operation of the device, every radial pipe must contain at least one drop of partitioning liquid extending diametrically across the tubular passage to form at least one partition therein for sealingly dividing the passage into two parts of different pressure. With the above arrangement, during rotation of the pipe assembly every quantity of dividing liquid injected by the nozzle 39 into the radial pipe 54 through the inner entrance to form a liquid partition moves radially outwardly therethrough until it reaches the trap portion 63 wherein said quantity of liquid remains trapped temporarily up to the time when the following predetermining portion of liquid is supplied into the same pipe. Thus, there always exists at least some quantity of liquid at the trap portion within every pipe. In addition, this portion of liquid forms a seal at the trap preventing the counterflow of gas from pump room b back into the pipes 54 through the outer openings thereof. Therefore, even when proper pumping action does not take place owing to the bubbles in the liquid, direct communication between the high pressure side and the low pressure side of the pumping device is prevented by the liquid stored at the trap portion 63 of the pipe 54 resulting in complete prevention of counterflow of the fluid to be treated, i.e. exhausted or compresser depending upon the desired use of the pumping apparatus.

Turning now to another preferred form of the present invention illustrated in FIG. 7 of the accompanying drawings, there is shown a pumping apparatus having radially extending fluid passage means of substantially different construction from that incorporated in the first embodiment shown and described above. Fluid passage means through which a portion of gas confined within a space defined by liquid films or walls is transferred radially outwardly under centrifugal force is shown having tubular construction in FIGS. 1 through 6 inclusive. In the embodiment shown in FIG. 7, however, the fluid passage means comprises a disc-like member or circular body generally indicated at 65. This rounded member could be defined as being formed by expanding one fluid pipe included in the pipe assambly shown in FIGS. 2 and 3 diametrically to an extreme. The manner in which pumping action takes place in radial pipe 54 and the member 65 differs in some degree with respect to each other. As illustrated clearly in FIG. 7, fluid passage or transferring means 65 comprises a pair of discs 65a, 65b mounted at inner periphery thereof on the generally cylindrical frame 53 and spaced a predetermined distance away from each other in the direction of its axis to define a circular spaced or gap therebetween for the passage of the partitioning liquid carrying fluid to be handled.

In order to prevent axial spreading out of the pair of circular plates 65a, 65b in the neighborhood of the outer periphery while there are rotated at a given speed, suitable connecting or clamping means 66 are employed to fixedly connect both plates in predetermined spaced relation with respect to each other at several points near their outer boundaries. Upon rotation of the passage member 65, partitioning liquid is injected intermittently from the nozzle 39 into the circular gap defined by circular plates 65a, 65b through annular entrance at the inner periphery thereof. The quantity of liquid injected into the circular gap tends to adhere or stick to the inner surfaces of both plates because of its adhesive property, thus frictionally engaging therewith. In the light of this frictional contact, the amount of liquid injected into the circular gap rotates together with the disc assembly 65 forming a ring-shaped liquid partition between the pair of discs 65a, 65b. As the disc assembly rotates at the predetermined operational speed, the annular liquid partition W spreads out radially outwardly within the annular gap toward the outer circumferential opening of the assembly under centrifugal force caused by the rotation thereof and transfers fluid to be drawn off or compressed therealong to effect exhaustion or compression on said fluid depending of the desired operation of the pumping apparatus as has been discussed. In this connection, breaking off or interruption in the radially expanding circular partition of liquid W must be avoided for the adequate pumping operation. Therefore, the axial distance between inner walls of the pair of discs 65a, 65b should precisely be determined with respect to the rotational speed of the disc assembly. Referring now to other essential components of the apparatus illustrated in FIG. 7, a casing 31 comprises a generaly cylindrical member formed with a relatively large flange portion 31a at the lower end thereof. When assembled, this flange portion is air-tightly placed over an annular liquid receptacle 67 supported on the top surface of a base member 68. A top plate 32 formed with a short tubular section defining an inlet opening therein covers the upper opened end of the cylindrical casing. The casing 31 is also provided with a short tubular section 34 at the flange portion which defines an outlet opening therein. At the lower end of a fluid supply pipe 38 is a nozzle means 39 comprising of a pair of ring members 39a, 39b of relatively reduced size in comparison to centrally apertured disc plates 65a, 65b. The upper ring 39a is securely affixed to the lower edge of the supply pipe and the bottom circular plate 39b is joined by means of suitable clamps 39c in axially spaced apart relation. In the drawing, the ring shaped nozzle member 39 is shown in horizontal radial alignment with the circular inlet opening of the disc assembly 65 at the center thereof. Since liquid flows from a tank 40 through supply pipe 38 radially out of the nozzle without interruption during operation, a nozzle being fixed in a given horizontal position with respect to the passage means 65 hinders effective pumping action as might be expected of the present apparatus. Assuming, for example, the nozzle member 39 is stationarily kept in horizontal alignment with the rotary passage means, then liquid from the nozzle enters into the passage between the circular plates 65a, 65b uninterrupted resulting in extremely little to no transfer of fluid to be handled. Therefore, in the embodiment shown in FIG. 7 it is of utmost necessity to reciprocate the nozzle member 39 along the longitudinal axis so as to displace it intermittently from the rotating disc assembly 65 in the axial direction. The present embodiment successfully accomplishes the above mentioned purpose by means of a suitable cam mechanism which is now fully described. As shown in the drawing, a tubular support frame 53 is provided at the upper edge thereof with an annular cam surface 53a sloping in one direction as viewed in vertical cross section. Thus, the rotary frame 53 functions as a cylindrical cam upon rotation. A cam follower member 69 is slidable disposed within cylindrical casing 31 against rotation, and rides directly on the cam surface of the cylindrical cam portion 53a of the rotary frame member 53. A coil spring 70a placed between the cover plate 32 and the top end of the cam follower 69 normaly biases the cam follower downwardly toward the cylindrical cam into perpetual operative contact with the cylindrical cam 53a. The liquid supply pipe 38 with the nozzle at its lower end is fixedly mounted on the cam follower 69 for movement therewith. A pair of bellows 70 maintain air-tight construction of the casing 31 while permitting the axial sliding movement of cylindrical cam follower within the casing.

With above arrangements, upon actuation of a driving motor 46, rotational movement is transmitted to the cylindrical cam portion 53a of the rotary frame 53 as well as to the circular passage assembly 65 through a coupling 49 and an intermediate driving shaft 43 rotatably mounted within base portion 68 by a pair of ball bearings 50, 51. As the cylindrical cam rotates, cam follower 69 experiences an upward and downward axial sliding movement within the casing due to the camming connection therebetween thereby causing a simultaneous upward and downward reciprocating movement of the supply pipe and the nozzle along the longitudinal axis. As the result of this longitudinal reciprocation of the nozzle with respect to the fluid passage means 65 liquid is intermittently introduced into the space between the rotating pair of discs 65a, 65b. Liquid thus supplied forms a generaly ring-shaped liquid on partitions W1, W2 within said circular space. The annular partitions of liquid rotate with the circulate plate assembly 65 because of the frictional engagement thereof with the inner surfaces of both discs, thus extending radially outwardly within the space between the plates 65a, 65b under the centrifugal force created by rotation thereof. As it spreads out the circular liquid partitions W1, W2 carry the gas confined therebetween radially outwardly through the space in the assembly 65 to effect pumping action. Every liquid supply must be injected into the passage means 65 while at least one annular liquid partition remains therein.

The fluid passage means of the type illustrated in FIG. 7 renders itself particularly advantageous when used in combination with partitioning liquids having sufficient viscosity to stick to and be rotated with the passage assembly 65, since it enables efficient utilization of space and is extremely simple in construction. Further the circular liquid partitions W1, W2 are driven radially outwardly through the passage means expanding its diameter; thus the smaller it tends to become in its vertical cross section resulting in possible breakage or fracture thereof that leads to an insufficient transfer of the fluid through the circular gap between the plates 65a and 65b. In order to avoid the above undesirable possibilities, the pair of circular plates 65a and 65b forming the circular fluid passage means 65 are preferably positioned and connected to each other in such axially spaced apart relationship that they may define an annular gap therebetween tapering radially toward its outer periphery in vertical cross section.

Connecting means 66 which join the pair of discs 65a and 65b in predetermnied spaced relation should have sufficient strength to transmit rotational torque between said discs connecting blocks 66 having an elongated shape in the radial direction such as shown in FIG. 7 may suitably be employed for this purpose. The pumping apparatus embodying the second preferred form of the invention shown in FIG. 7 operates substantially similar to the first embodiment already discussed with reference to FIGS. 1 to 4 inclusive.

According to the apparatus of this second embodiment efficient and rapid forced transfer of the fluid to be treated is achieved by annular liquid partitions or films expanding radially outwardly without breakage between the pair of closely spaced circular discs 65a and 65b enabling excellent pumping operation. The circular passage means 65 is simple in structure and permits effective utilization of space, said means preferably can be used in connection with partitioning liquids of higher viscosity as these liquids tend to stick to the inner surfaces of the discs and readily be rotated therewith. The illustrated circular passage assembly 65 possesses the further advantage in that it rids itself of accumulation of dusts or other foreign matters contained in the partitioning liquid diminishing possible mulfunction associated therewith.

In the second embodiment shown in FIG. 7, upward and downward reciprocating of the nozzle 39 is produced by means of a pair of cylindrical cam portions 53a and 69. However, other types of reciprocating mechanism may suitably be provided outside the pump casing 31 if desired for the same purpose.

Figure 8:
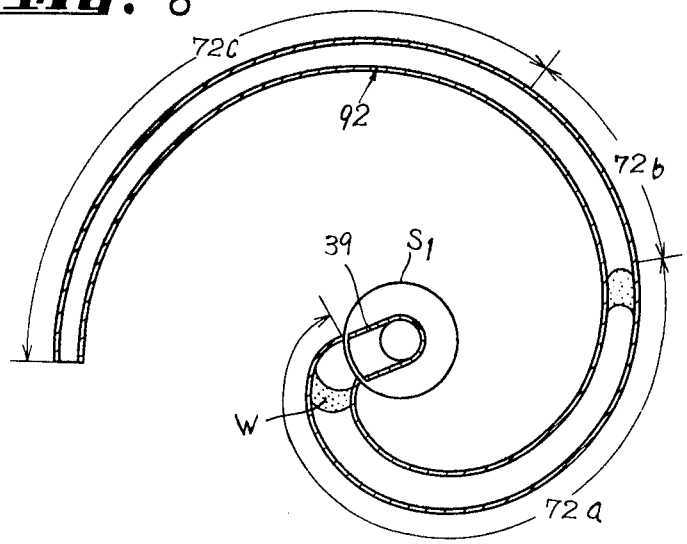

FIG. 8 shows a modified form of radially extending passage means that can satisfactory be incorporated within the pumping apparatus of this invention to thereby improve the pumping function. In FIG. 8 there is illustrated only a unit of radially extending passage means 72 for the purpose of simplicity but a plurality thereof may be employed in actual practice as disclosed hereinafter. The fluid passage unit 72 is substantially identical in construction with those shown in FIGS. 3 and 6 except for its general and vertical cross-sectional configuration. As noted previously, for the proper pumping operation of the present apparatus, at least one liquid partition must exist within each radial passage or pipe to fluid-tightly separate the passage into a high pressure side and a low pressure side. To this end, in the illustrated embodiment of FIG. 8, the fluid passage is shaped in the form of a spiral or helical tubing as shown in the drawing and has a generally rectangular cross-section for space utilization reasons. The unit 72 includes an inlet section 72a of higher fluid conductance having maximum possible cross-sectional area which permits the formation of a liquid film extending diametrically therein, and an outlet section 72c through which the fluid or gas to be handled is caused to move radially outwardly against atmospheric pressure by liquid partition. An intermediate section 72b connects both sections 72a and 72c together. In order to increase the intensity of centrifugal force acting on unit cross-sectional area, outlet portion 72c of the passage unit 72 has a smaller cross-sectional area as compared with that of inlet portion 72a. Relative length of both the inlet portion and the outlet portion should be determined such that there exists at least one liquid partition in both sections 72a and 72c during operation. In actual practice, as noted briefly above and will be described in detail hereinbelow, a plurality of spiral passage units 72 of FIG. 8 may be assembled in one to form a fluid passage assembly in the shape of a flat circular cylinder. In order to minimize dead space i.e. the waste of space in such assembled relation, each passage unit may preferably be curved in the form of an involute as shown in FIG. 3.

Figure 9:
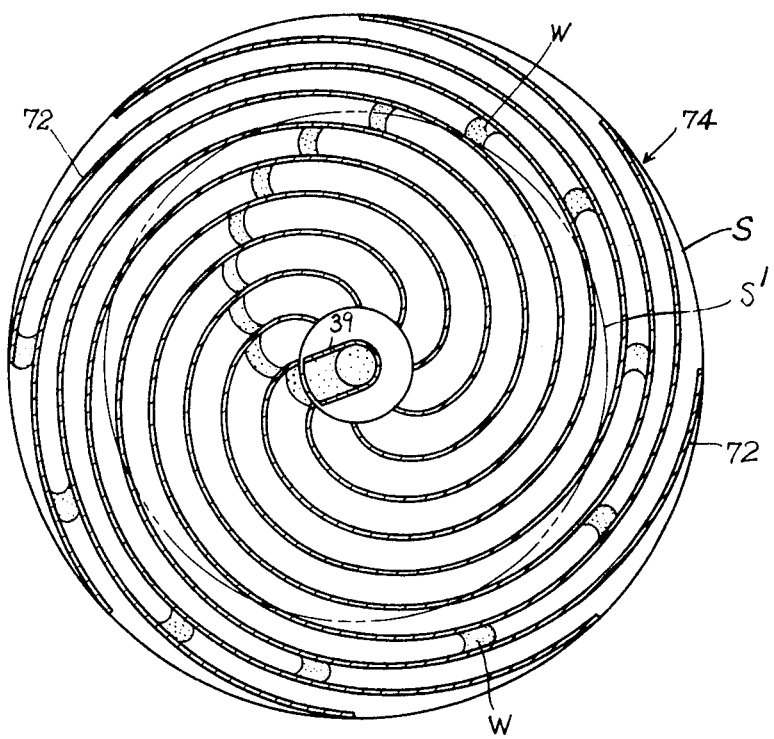
FIG. 9 is a horizontal cross sectional view of a radial fluid passage assembly comprising a plurality of the radial passage units of FIG. 8 arranged together in a horizontal plane.

A number of passage units of FIG. 8 are illustrated in FIG. 9 in horizontally assembled relation around an imaginary circle S', with said plurality of units completely filling a given circular area. With this arrangement, a compact design of a cylindrical passage assembly 74, in which each passage 72 has sufficient length, becomes possible. As shown in the drawing a dotted line tracing the outer end of inlet portion in each unit 72 defines a circle S'. Intermediate or connecting portion 72b in FIG. 8 may be of any shape as long as it does not jeopardize the desired forced transfer of the liquid partitions carrying together the fluid to be handled.

Figure 10:
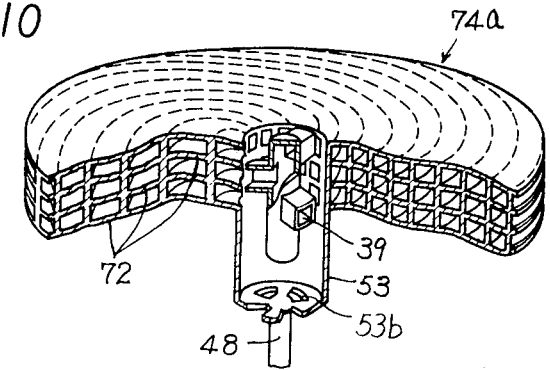
FIG. 10 is a partially cut-off, perspective view of a multi-stage fluid passage body which is constructed of a plurality of the radial fluid passage assemblies of FIG. 9 joined together in vertically overlapped relation.

In FIG. 10, there is illustrated, partly in cross-section, a multi-stage fluid passage assemblage 74a comprising three sets of passage assemblies 74 of FIG. 9 arranged vertically in overlapping relation one on the other around the outer surrounding wall of rotary frame member 53, which is operatively connected to the driving shaft 48. Reference numeral 39 denotes a fluid supply nozzle which injects partitioning liquid into each passage unit 72 in the similar manner already described.

In accordance with the embodiments shown in FIGS. 9 and 10, rotary fluid passage means 74 and 74a are constructed of a plurality of pipe-like units 72 arranged in horizontal juxtaposition (and in multi-layer as in FIG. 10). As each unit 72 is curved in the form of an involute having a generally rectangular cross-section, when assembled in pluralities in juxtaposed relation as shown either in FIG. 9 or 10 to form a rotary passage body 74 and 74a, no dead space will exist between contacting walls of the units. In other words, all available space within body 74 or 74a is substantially occupied by the passageway of units 72.

By one aspect of the present invention, pumping apparatus particularly shown in FIGS. 1, 2 and 7 is preferably provided with a suitable pulsating device to impart pulsation to the liquid passing through supply conduit 38. Any conventionally known types of pulsating mechanism can be utilized for this purpose, two of which are diagrammatically shown in FIGS. 11 and 12.

In FIG. 11, a pulsating device generally indicated at 76 comprises essentially a cylindrical member 77 communicating with supply conduit 33 and a piston or plunger 78 slidably positioned within the cylinder. The plunger 73 is normally biased into engagement with an eccentric cam 79 mounted on a shaft 80. A suitable power interlocking mechanism (not shown) transmits the rotation of the radially extending fluid passage assembly 47 to the shaft 80 causing the rotation of cam 79. The rotation of the eccentric cam, in turn, causes the reciprocating movement of plunger 78 within cylinder 77 and the reciprocating plunger imparts pulsation to the liquid in the cylinder communicating with feed conduit 38. A pair of spherical valves 81 and springs 82 furnished within the feed conduit form a check valve of the known construction which prevents the liquid forced out of cylinder 77 by the reciprocating plunger from flowing back toward the tank 40. Thus, as eccentric cam 79 rotates during operation, pulsating motion is imparted to the portion of supply liquid downstream of the check valve in the feed pipe 38 and pulsating liquid flows out of nozzle member 39.

Pulsating mechanim 76a illustrated in FIG. 12 consists of a cylindrical member 77a connected within the liquid supply conduit 38. A plunger 78a is located within the cylinder 77a for axial sliding motion and is in driving engagement with an eccentric cam 79a mounted on a shaft 30a. A secondary pipe 32 is connected with the main pipe 38 so as to bypass the cylinder. The eccentric cam rotates to impart pulsating motion to the liquid passing through by-pass pipe 82 towards the nozzle (not shown) by the reciprocation of plunger 78a. Other types of pulsators conventionally employed in various hydraulic mechanisms may effectively be incorporated into the pumping apparatus of this invention in order to give pulsating motion to the partitioning liqud flowing out of nozzle means.

By imparting such beating motion to the liquid passing through the feed pipe, both positive supply thereof into the radially extending passage means and complete formation of liquid partitions therein are assured resulting in good gas conveyance through the passage during operation of the pumping equipment with pulsating mechanism. In addition, as contrasted with non-pulsating liquid flow, a pulsating flow of liquid possesses excellent advantage in that it positively thrusts gas or fluid to be handled into the radial passageways when it is injected intermittently thereinto for the initiation of pumping action. Further, pulsating liquid flow facilitates the formation of desired liquid partition in the radial passages with a minimum quantity thereof.

Turning now to FIG. 13 of the drawings, there is illustrated a pumping apparatus in accordance with still another preferred form of this invention in which nozzle means is adapted to be rotated at a given speed by a driving motor in either direction with respect to the direction of rotation of rotary fluid passage means, or to be rotated into instantaneous synchronization with rotating fluid passage means.

A nozzle member 39 integrally joined to a rotary shaft 48a at its lower end and connected at its upper end to a supply pipe 38 through an oil seal 83 for rotational movement thereof with respect to the fixed pipe is longitudinally disposed within a rotary cylindrical frame 53. A pump casing generally indicated by reference numeral 31 comprises a basin-like main body 31a supported on frames 44, an intermediate cover plate 31b and a top cover plate 31c. The cylindrical frame 53 which has a plurality of radially extending passage means 54 mounted therearound in a manner already discussed is rotatably supported within pump casing 31 by means of a pair of bearings 84 and 84a accommodated respectively within the top and intermediate cover plate. A pair of bearing means 85 and 85a positioned within the rotary frame 53 at the lower end thereof and within the main body portion 31a at a bottom depression thereof rotatably support driven shaft 48a. A driven gear 86a is fixedly mounted onto the driven shaft and is in intermeshing relation with a drive gear 86 which, is secured on a driving shaft 48 rotatably supported at both ends by a pair of shaft bearings 50 and 51. A coupling 49 connects drive shaft 48 with a driving motor 46 mounted on a base member 45. With this arrangement, the motor drives nozzle member 39 at a given rate of rotation while rotary fluid passage assembly generally indicated at 47 is coupled in driving engagement with the motor 46 by a gear train comprising a drive gear 87 secured to the drive shaft 48 and a driven gear 87a fixedly disposed around the lower end portion of rotary member 53. Thus, upon actuation of the motor, rotation thereof causes the rotation of fluid passage assembly 47. Partitioning liquid is fed from a storage tank (not shown) through supply pipe 38 and nozzle 39 into radially extending passage means 54 to form a plurality of partitions therein in the similar manner as disclosed above. The partitioning liquid passing radially out of passages 54 is collected within an annular recess 88 formed in casing 31 and ultimately discharged through a discharge pipe 55. A relatively short inlet or suction pipe 35 is placed over the upper enlarged portion of support frame 53 with oil seal 58 interposed therebetween for air tightly closing the annular gap between the pipe and the frame while allowing rotation of the latter with respect to the former. Another oil seal 83a placed between the inner and outer walls of rotary frame member 53 and driven shaft portion 48a respectively substantially prevents fluid flow between an inlet chamber or low pressure chamber a and a gear accommodating compartment c. The top cover plate 31c of the pump casing is further provided with an outlet or exhaust pipe 34.

In the pumping construction shown in FIG. 13, for satisfactory operation thereof, the nozzle and the pipe assembly must be rotated at different operational speed since synchronized rotation of the nozzle and the pipe assembly results in a liquid supply into a limited number of radial passage means 54 i.e. the nozzle 39 fails to feed partitioning liquid into every one of the plurality of radial passageways of the assembly 47. In the illustrated embodiment, the gear ratio between gears 86a and 86 is 2:1, while the gear ratio between 37a and 37 is 10:7. Thus, a ratio of 5/7 is obtained between rotational speed of nozzle 39 and passage assembly 47. In other words, while the nozzle turns one revolution on its axis, the pipe assembly rotates 1⅖ of a rotation.

As an additional construction, passage assembly 47 is integrally formed with a downwardly extending annular projection 54a on the underside thereof which prevents the flowing out partitioning liquid from moving along the bottom surface of the assembly and into shaft bearing 84a, thus causing a detrimental effect thereupon. When operating the apparatus shown in FIG. 13 as a compressor, it is required to air tightly close pumping room b in the area of bearing 34a by the provision of suitable sealing devices.

With the illustrated construction of drive mechanism, both nozzle 39 and assembly 47 are rotated in one direction either clockwise or counterclockwise at different operational speeds. However, the nozzle member may be caused to rotate in opposite direction with respect to the rotation of the pipe assembly.

Figure 14:
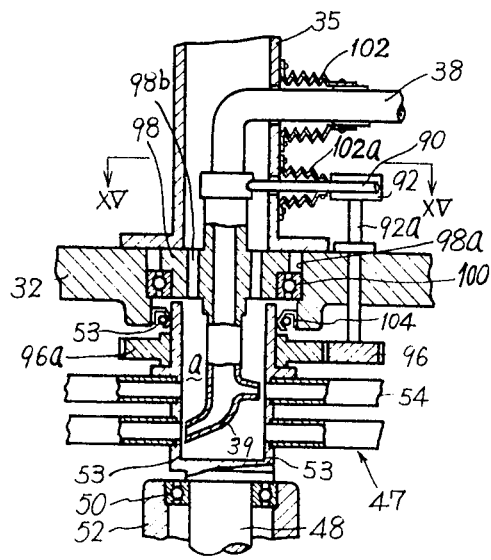
FIG. 14 is a fragmentary sectional view showing a driving mechanism for imparting a predetermined angular reciprocation to a liquid supply nozzle.
Figure 15:
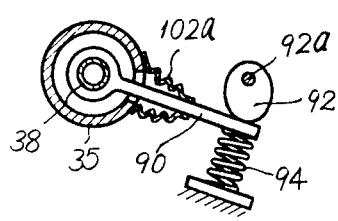
FIG. 15 is a cross sectional view taken substantially along lines 15—15 of FIG. 14 showing essential components of the driving mechanism.

FIGS. 14 and 15 show a different manner of imparting a relative movement to nozzle member 47 with respect to nozzle member 39 in which the nozzle assumes a predetermined angular reciprocation on its longitudinal axis. The detailed construction of one form of a drive mechanism for giving the above mentioned type of movement to the nozzle member is illustrated in the drawings. The drive mechanism comprises essentially a radially extending elongated lever 90 which is fixedly mounted on the upper portion of nozzle member 39 at one end and is in operative contact with an eccentric cam member 92 at the other end. Cam 92 is secured to a shaft 92a for rotation therewith. Shaft 92a is provided at the lower end thereof with a gear member 96 intermeshing with a gear 96a of greater diameter which is fixed around rotary cylindrical frame 53. The frame with a plurality of radial passage means 54 is, in turn, operatively connected to a driving motor (not shown) by driving shaft 43. As shown in FIG. 15, suitable spring means 94 normally biases radial lever 90 into engagement with eccentric cam 92. Upon energization of the driving motor, the rotation thereof is transmitted to the eccentric cam through rotary frame member 53, intermeshing gear train 96 and 96a and driven shaft 92a. The rotation of cam 92 causes the rocking motion of radial lever 90 on longitudinal axis of nozzle member 39 which, in turn, creates a predetermined angular reciprocation of the nozzle on its axis.

In order to facilitate the angular reciprocating movement, nozzle member 39 is integrally formed with a support flange 93 providing a planar surface perpendicular to the longitudinal axis thereof and is rotatably supported within a central opening or bore 98a in the pump casing by a bearing member 100. A plurality of elongated holes 98b axially formed through support flange 98 permit the passage of air or gas from an inlet or suction tube 35 toward radial passage means 54. Bellows 102 and 102a provide means for air-tightly joining supply pipe 38 and rocking lever 90 respectively with inlet tube 35 while allowing desired angular reciprocation of both components 38 and 90. An oil seal 104 is located within the center bore 98a between top cover plate 32 of casing and rotary frame 53 to thereby sealingly close the annular gap therebetween against air flow between inlet or low pressure chamber a and pump room b.

In the driving arrangement shown in FIGS. 14 and 15, the rocking motion of lever 90 is closely connected with the rotation of pipe assembly 47 so as to angularly reciprocate the nozzle in a predetermined relation with respect to the rotational movement of the assembly. An irregular angular distribution of the radial pipes around the rotary support member tends to cause an uneven or unstable liquid supply thereinto. In order to avoid such inconvenience, radial passage means 54 may preferably be disposed around rotary frame 53 with each passage spaced an equal angular distance with respect to the adjacent ones.

In the embodiment shown in FIG. 14, nozzle member 39 is adapted to be rotatably driven by the driving mechanism positioned outside inlet tubing 35, but another embodiment wherein the nozzle is rotated by a drive mechanism located within the inlet pipe is also possible. In such arrangement, nozzle 39 may be separated from feed pipe 38 for relative rotation therebetween. This arrangement makes it easier to establish an air tight construction of the device. Such embodiment also eliminates flexible bellows 102 and 102a shown in FIGS. 14 and 15.

The important feature of the pumping apparatus according to the embodiment illustrated in FIGS. 14 and 15 lies in that an angular reciprocating movement about the longitudinal axis of the rotary assembly 47 is imparted to liquid supply means or nozzle member 39 and it becomes possible with it to increase or decrease the number of repeated liquid injections into the rotating fluid passages during each revolution of the fluid passage assembly. Instead of such an angular reciprocation an intermittent rotation in one direction with respect to the fluid passage assembly may be also suitably given to the nozzle member for assuring a positive liquid supply into the fluid passages as well as a perfect formation of liquid partitions therein which enables an excellent pumping action with the minimum amount of partitioning liquid.

Figure 16:
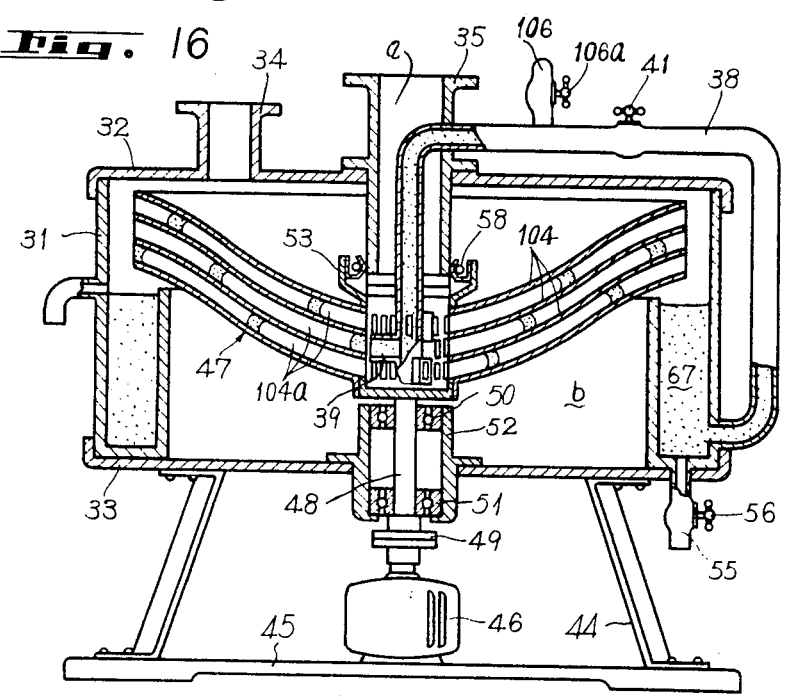
FIG. 16 is a cross sectional view of a pumping apparatus embodying still another form of this invention in which the liquid flowing out of the radially extending fluid passage means is recirculated through an overhead conduit and a nozzle member back into said passage means for continuous use thereof as partitioning means.

In FIG. 16 there is illustrated in vertical cross-section a pumping apparatus according to still another embodiment of this invention which is more simple in structure as compared with the pumping apparatus of the preceding embodiments. In the drawing, a tubular casing 31 is covered at both open ends with a top plate 32 and a bottom plate 33 defining therein a pump room *b* in which a generally bowl like rotary body 47 located. The rotary body comprises four dish-shaped centrally apertured shallow circular member 104 assembled together in equally spaced, overlying relationship defining therebetween a plurality of circular gaps. Radially extending partition walls (not shown) divide each circular space formed between dish-shaped members 104 into a predetermined number of radially extending fluid passages 104a. Rotary body 47 is mounted at its apertured center on a cylindrical frame 53 which is connected through an intermediate drive shaft 48 and a coupling member 49 to a driving motor 46. A plurality of openings are formed in the surrounding wall of cylindrical frame 53 corresponding in number and position to the inner entrances of rotary fluid passage assembly 47. A retaining housing 52 secured to bottom plate 33 supports drive shaft 48 through a pair of bearings 50 and 51 for rotation with motor 46. An oil seal 58 air-tightly connects the cylindrical frame to an inlet or suction pipe 35 fixedly mounted on top cover plate 32 for relative rotation thereof with respect to the pipe. A nozzle member 39 having a plurality of nozzle openings is positioned within tubular rotary frame 53 and is integrally connected to one end of supply pipe 38 projecting into inlet pipe 35 for injecting liquid supply from the feed pipe into radial passages 104a through inner entrance thereof during operation. At the other end feed pipe 33 is jointed to the lowest portion of an annular liquid reservoir 67 provided within casing 31 and having sufficient depth. As the liquid contained in reservoir 67 has a preselected head of fluid, with a valve 41 connected within feed pipe 38 in its open position the liquid flows from reservoir 67 to nozzle member 39 by way of supply conduit 38. The liquid reservoir is provided at the bottom with a liquid discharge tube 55, while the supply pipe with a secondary pipe 106 having a priming valve 106a therein for introducing priming liquid.

Turning now to the manner of operations of the apparatus shown in FIG. 16 when used as a vacuum pump, actuation of motor 46 drives rotary fluid passage assembly 47 at a given rotational speed. With main valve 41 in its closed position, priming valve 106a is first opened to introduce priming liquid from a source (not shown) through feed pipe 38 into nozzle 39. The applied priming liquid is then injected through nozzle 39 into rotating fluid passages 104a of the assembly through the inner entrance thereof and forms liquid partitions or walls in said passages separating the fluid or air entrained therein into high and low pressure portions. These liquid partitions move to transfer the air radially outwardly through passageways 104a under the centrifugal force produced by the rotation of assembly 47 until finally they are discharged out through the outlet opening into liquid receptacle 67. As the result of this initial portion of operation, there is created within rotary frame 53 a vacuum condition sufficient to cause and maintain liquid circulation from reservoir 67 through feed pipe 38 to nozzle 39. In addition, partitioning liquid thrown off from radial passageway 104a into receptacle 67 increases the head of the fluid therein to thereby facilitate the above mentioned liquid recirculation. At this point of operation, priming valve 106a is closed and main control valve 41 is actuated to its open position permitting the passage of liquid therethrough toward nozzle 39. In this manner, during operation of the apparatus, partitioning liquid continues to be circulated from reservoir 67, through feed pipe 38, nozzle 39 and the plurality of radial passages 104a and back into reservoir 67 effecting thereby the desired pumping action. In the embodiment illustrated in FIG. 16, liquid circulation is made through the feed pipe extending upwardly along the surrounding wall of casing 31 and then passing radially over top cover plate 32. However, the circulation of partitioning liquid will readily be effected through other pipe construction than the overhead pipe shown in FIG. 16.

Figure 17:
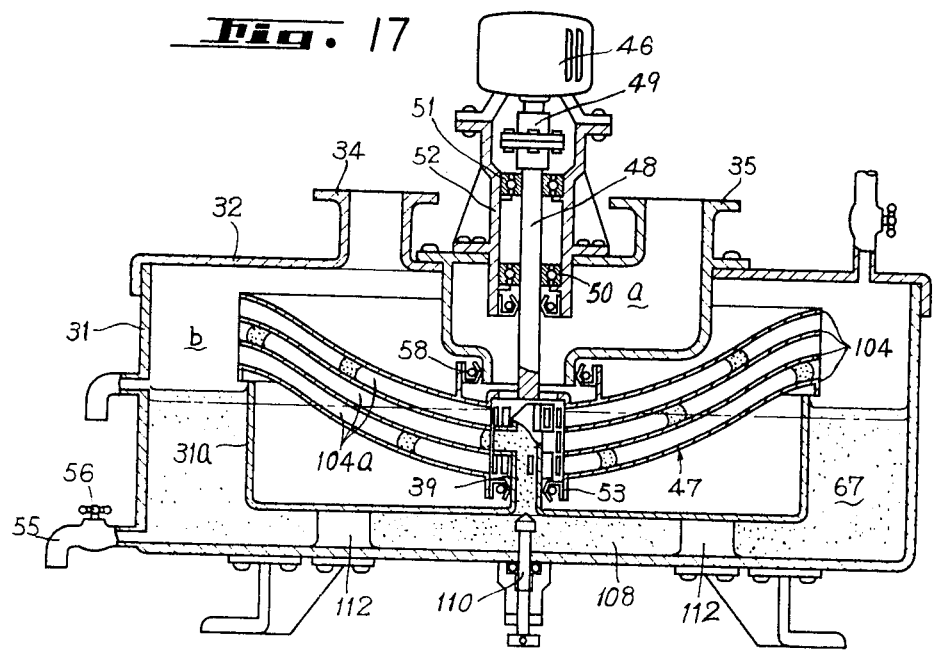
FIG. 17 is a sectional view of a pumping apparatus of a similar embodiment to that shown in FIG. 16 in which a return path for circulating the liquid is provided at the bottom of a pump casing.

FIG. 17 illustrates still another embodiment of the present invention wherein the overhead feed pipe shown in FIG. 16 has been omitted. In this embodiment, there is provided at the bottom of pump casing 31a liquid path 108 substantially co-extensive with bottom wall thereof. This fluid path communicates an annular reservoir 67 with an upright nozzle member 39 centrally located within and upwardly projecting rotary support frame 53. Support frame 53 fixedly carrying fluid passage assembly 47 therewith is connected in operative relation with driving motor 46 supported in a position above pump casing 31 through a torque transmitting mechanism which includes an intermediate drive shaft 48 and a coupling member 49. A flow controlling means 110 which is located in the center of circular fluid path 108 immediately below upstanding nozzle member 39 regulates the passage of partitioning liquid from reservoir 67 into the nozzle. An internally positioned member 31 which forms together with outer casing 31 annular reservoir 67 as well as fluid path 108 substantially co-extensive with the bottom is supported by means of support blocks 112 in vertically spaced relation with respect to the bottom wall. Partitioning liquid may preferably be placed within annular receptacle 67 in such quantity that the liquid level therein does not fall below horizontal level indicated by the dotted line even when flow controller 110 is actuated to its open position permitting the liquid in receptacle 67 to flow into radial passages 104a through nozzle member 39. With this being the case, the liquid in reservoir 67 holds a certain degree of throw with respect to the nozzle top.

Upon actuation, motor drives rotary fluid passage assembly 47 at a given rate of rotation and a quantity of liquid initially contained in passageway 104a is caused to move radially outwardly therethrough under the influence of centrifugal force, during which the liquid takes the form of a partition or wall and carries together air or gas within the passage. Consequently, slight but enough vacuum is created in the neighborhood of the inner entrance of radial passage 104a resulting in subsequent liquid flow thereinto through nozzle 39 as well as air flow thereinto through inlet pipe 35. In this manner, liquid circulation from reservoir 67 through fluid path, 108 fixed nozzle 39 and rotating passage assembly 47 and back into the reservoir is initiated and continued during operation of the driving motor so as to effect pumping action in the similar manner as discussed above. It will be readily understood to those skilled in the art that upwardly curved radial passageways are preferred in the embodiments of FIGS. 16 and 17 for throwing off the liquid therethrough into a lifted point with respect to nozzle member 39 giving it a "throw" which serves to facilitate liquid recirculation. The upper wall of rotary frame 53 is provided with axial apertures for the passage of air from the inlet portion a into the rotary frame.

Figure 18:
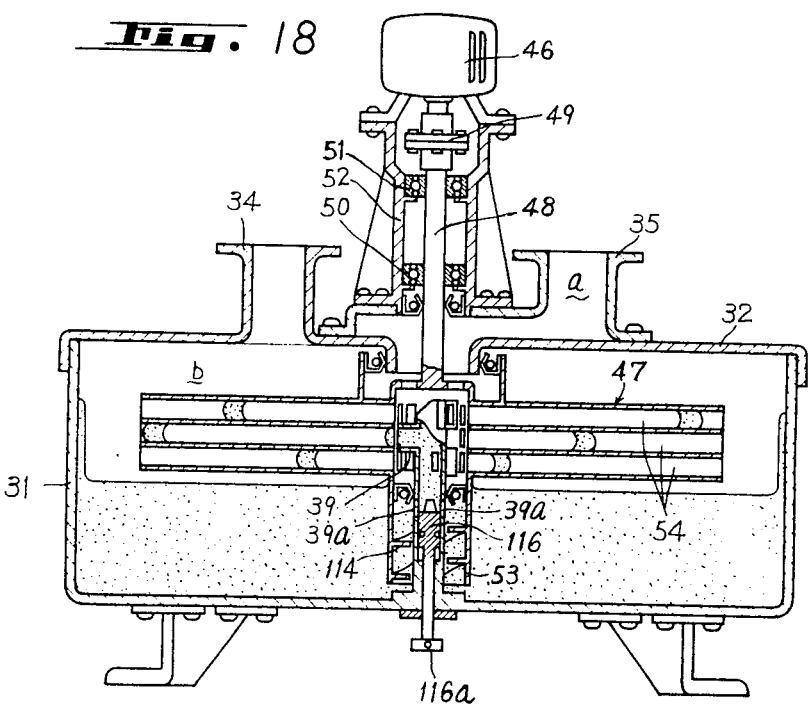
FIG. 18 is a sectional view of a pumping apparatus of a similar embodiment to that shown in FIG. 16 in which a positive liquid circulation is carried out by means of a screw member positioned around the lower portion of the nozzle means.

Another embodiment shown in FIG. 18 differs essentially from those illustrated in FIGS. 16 and 17 in that a screw member is provided in liquid path for positive circulation of the liquid. More specifically, the interior wall of the lower portion of rotary frame 53 is provided with screw 114 and a nozzle member 39 extends longitudinally therethrough. The rotary frame is mounted around the upper portion thereof with fluid passage assembly 47 having a plurality of horizontal radial passages 54 and is connected to driving motor 46 by means of shaft 48 and coupling 49. With this arrangement, screw member 114 is rotated by the drive motor together with rotary assembly 47 to convey the liquid within casing 31 upwardly into nozzle 39 through side apertures 39a. A valve body 116 is slidably disposed within nozzle member 39 for closing and opening apertures 39a and thus serves as a flow controller which regulates the liquid flow through apertures 39a. Valve 116 is further provided with control knob 116a for manipulation thereof.

During operation of the pumping apparatus of FIG. 13, the liquid stored in pump casing 31 is upwardly transferred through side apertures 39a into nozzle 39 by rotating screw 114 and a forced circulation of liquid from the lowest portion of casing 31 through rotary frame 53, nozzle 39 and radial passages 54 and back into the casing results. Therefore, it is unnecessary to form passage assembly 47 in the shape of a shallow bowl for giving each radial passageway 54 an upwardly curved cross-sectional configuration due to the fact that the forced liquid circulation requires no head of fluid.

Figure 20:
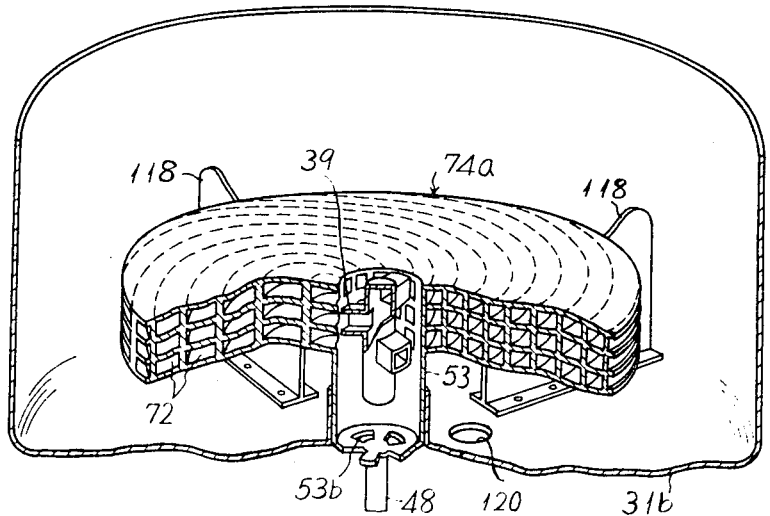
FIG. 20 is a fragmentary, partly cut off, perspective view of the pumping apparatus of FIG. 19 which shows the rotary fluid passage body and the inner casing together with partition walls for facilitating a radially outward transfer of the liquid.
Figure 19:
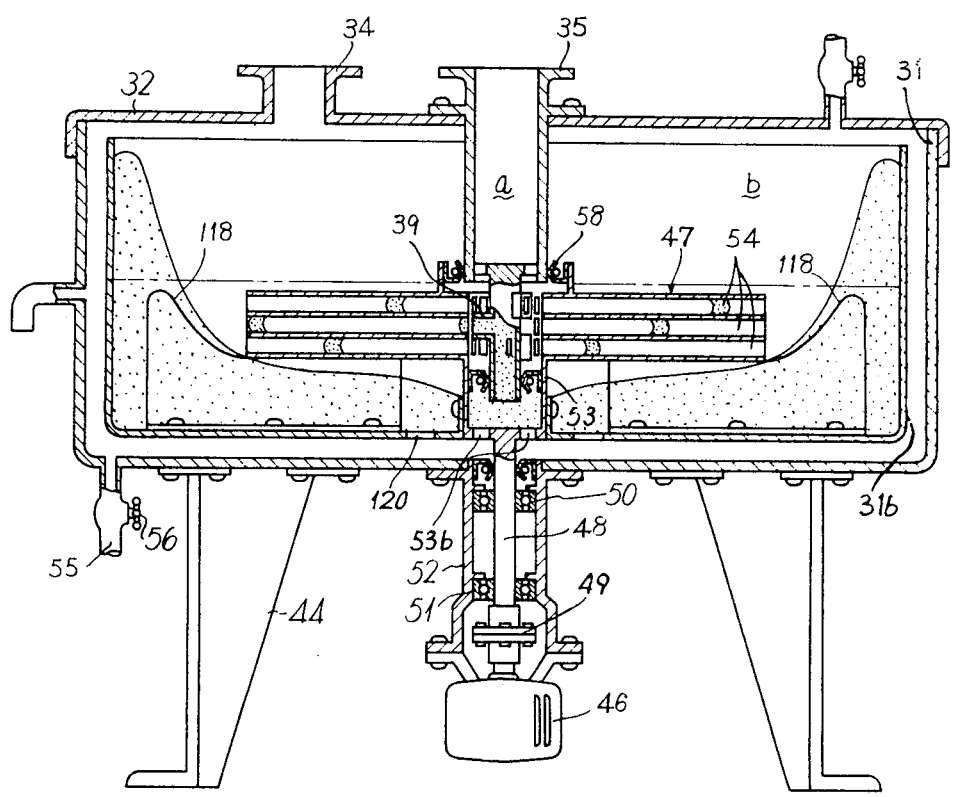
FIG. 19 is a sectional view of a pumping apparatus embodying still another form of this invention in which an inner casing filled with liquid is rotated together with radial passage means and particle free liquid is circulated into nozzle means.

In FIGS. 19 and 20, there is illustrated still another embodiment of this invention in which outer casing 31 contains therein a cylindrical inner casing 31b which forms a liquid receptacle. The inner casing is securely mounted at the center thereof on rotary frame member 53 for rotation with fluid passage assembly 47. A plurality of radially extending, upright partitions 118 are attached to the bottom wall of the inner casing 31b.

The liquid normally fills up the inner casing at rest to the level indicated by the dotted line, thus completely immersing the rotary passage assembly therein. Upon operation of driving motor 46, rotary passage assembly 47 and inner casing 31b are simultaneously rotated by the motor through coupling member 49 and connecting shaft 48. The liquid within the inner casing is driven radially outwardly under a centrifugal force and the greater amount thereof is collected towards and held against the surrounding wall of inner casing 31b, thereby causing the downfall of upper liquid surface in the center or radially inner section of the casing below the level of the bottom surface of rotary passage assembly 47 as illustrated in the drawing. In other words, passage assembly 47, as it is rotated, emerges out of the liquid surface to expose itself to the surrounding atmosphere within casing 31. The plurality of partition walls 118 serve to facilitate radial transfer of the liquid toward the outer surrounding wall of inner casing 31b. During this starting portion of operation, the quantity of liquid initially held within radial passages 54 is also forced radially outwardly carrying the air and liquid contained in said passages together and vacuum is produced within the upper section of rotary frame 53 resulting in the continued supply of liquid through nozzle 39 into those radial passageways. The liquid in inner casing 31b flows through centrally located apertures 120 into the annular space between the bottom walls of outer and inner casing 31 and 31b and then into the lower section of the rotary frame 31b through axial openings 53b in the bottom thereof. From there, it is drawn upwardly into nozzle member 39 under pressure differential. Since substantially all solid particles and other foreign matter in the liquid are expelled radially outwardly toward the outer surrounding wall of the inner casing 31b by a centrifugal force particle-free portion of the liquid enters through apertures 120 located in the center region of the bottom into nozzle 39. Rotary passage body 47 has been illustrated as having four layers of radially extending spiral passageways, without intending to limit the construction thereto.

In the embodiments illustrated in FIGS. 16 through 20 inclusive, the pumping apparatus is integrally provided with a liquid circuit for self-recirculation of the liquid discharged out of the radial passageway back into the nozzle. This arrangement eliminates various components otherwise needed and enables a compact and low-cost construction of the pumping device. Further, it excludes possible stoppage of liquid supply as well as possible waste thereof thus assuring a fool-proof pumping action.

Figure 21:
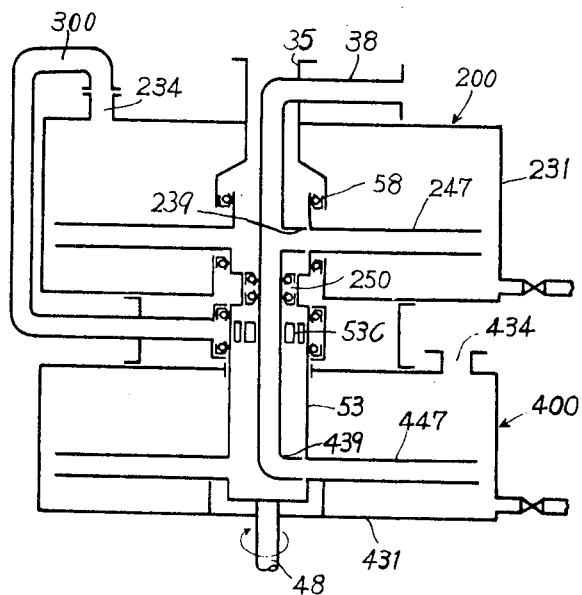
FIG. 21 is a diagrammatic cross sectional view of a multi-stage pumping apparatus in accordance with still another form of this invention in which two pumping sections are connected together by a unitary frame member and supplied with liquid through a common feed conduit.
Figure 22:
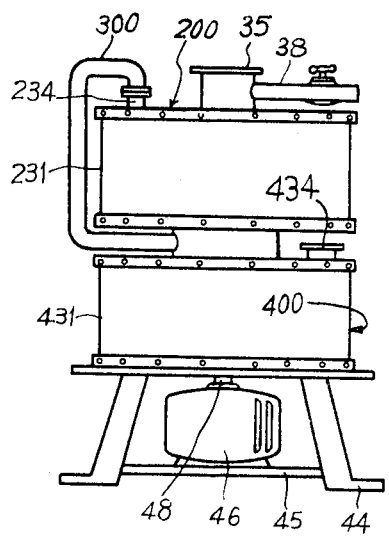
FIG. 22 is a perspective view of the pumping apparatus of the multi-stage type diagrammatically illustrated in FIG. 21.

FIGS. 21 and 22 illustrate diagrammatically a multi-stage pumping construction having two pumping mechanisms constructed in accordance with the working principle shown in FIG. 4. More specifically the multi-stage pumping combination comprises an upper pumping section 200 and a lower pumping section 400, each section having a similar structure to that shown in FIG. 1 through 3. In this combination, both sections 200 and 400 have one rotary support frame 53 and liquid supply pipe 38 in common. For the simplicity illustration and the ease of explanation, corresponding components in both sections 200 and 400 are indicated by corresponding reference numbers. A single rotating support frame 53 is positioned so as to extend substantially through both upper and lower casing 231 and 431 along the longitudinal axis and is connected at the upper open end with fixed inlet conduit 38 through interposed oil seal member for relative rotation and at the lower closed end to a drive shaft 48 coupled with a motor (not shown). A single liquid supply pipe 38 projects downwardly into unitary frame 53 and is provided with upper nozzle 239 and a lower nozzle 439. Upper and lower nozzles 239 and 439 inject the liquid fed through supply conduit 38 into upper and lower radially extending passage means 247 and 447 respectively, which means are mounted on single rotary frame 53 for rotation therewith. Discharge conduit 300 connects outlet port 234 of upper pump section and the lower interior of unitary support frame 53 together through a plurality of side aperture 53c formed in the intermediate portion of the surrounding wall of rotary frame 53.

With this multi-stage arrangement, air or fluid which is drawn out by the upper pumping section 200 is directed through discharge conduit 300 and side apertures 53c into the lower interior of unitary support frame 53. From there, the air is conveyed through lower radial passage means 447 and lower discharge conduit 434 out of lower casing 431 by the additional pumping action of the lower pumping section 400. A sealing member 250 is provided to fluid-tightly separate the interior of unitary support frame 53 into upper and lower portions i.e. the member 250 prevents the liquid accumulated in the upper portion from flowing down into the lower portion. Therefore, the liqiud which accumulates in the upper portion of unitary support frame 53 during operation should be removed by suitable means.

FIG. 22 illustrates a pumping apparatus in accordance with this invention having a multi-stage internal construction of FIG. 21. Upper and lower pumping casing 231 and 431 of the multi-stage pumping apparatus shown in FIG. 22 are joined together by a cylindrical connecting shank 350. Both the upper and lower pumping mechanical 200 and 400 are simultaneously driven by motor 46 during operation.

Figure 23:
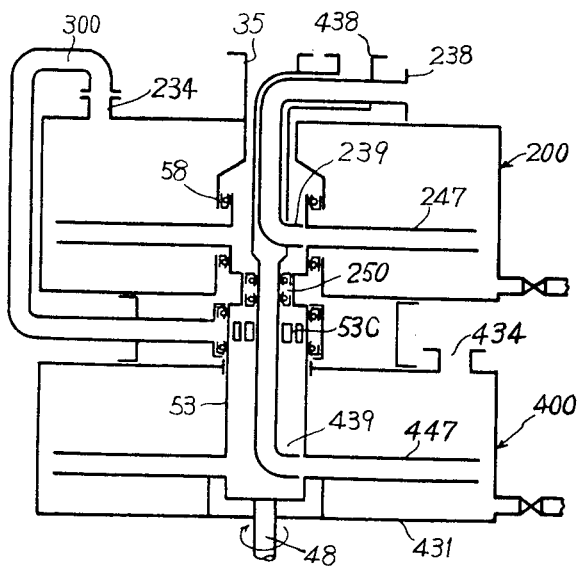
FIG. 23 is still another embodiment of the multi-stage pumping apparatus of the present invention in which both pumping sections are supplied with liquid through separate feed conduits connected to different liquid sources.
Figure 24:
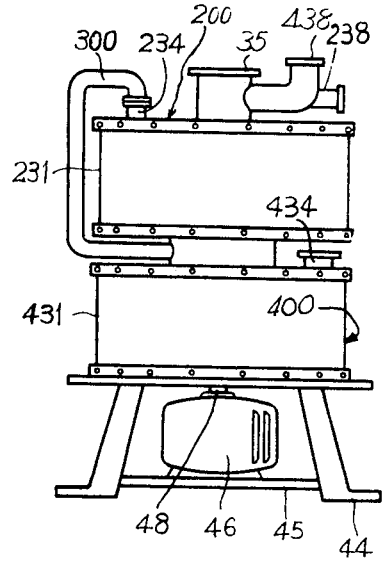
FIG. 24 is a perspective view of the multi-stage pumping apparatus diagrammatically illustrated in FIG. 23.

The multi-stage pumping apparatus illustrated in FIG. 23 and 24 has a substantially similar construction to that of FIGS. 21 and 22 but slightly differs therefrom in that each pumping section 200 and 400 possesses an independent liquid supply pipe. In the illustrated pumping device, the liquid supply means comprises a double pipe having coaxially disposed inner and outer tubings 238 and 438. Both inner and outer tubing 238 and 438 are provided at the lower end thereof with upper and lower nozzle 239 and 439 respectively and are connected at other ends to a separate liquid supply source (not shown).

In FIGS. 21 through 24, the multi-stage pumping apparatus embodying one form of this invention has been illustrated as comprising two pumping sections 200 and 400 coaxially disposed along the longitudinal axis with connecting shank 350 therebetween. However, a multi-stage construction having any number of pumping sections other than two is also possible in accordance with the present invention. With respect to the particular embodiment shown in FIGS. 23 and 24, a coaxial double pipe member has been incorporated in order to provide a separate liquid supply service into upper and lower pumping section 200 and 400. Instead of a double pipe construction, it is also feasible to place a pair of individual tubings in juxtaposed relation within rotary support frame 53.

As described above, in the multistage pumping device of FIGS. 22 and 23, both the upper and lower radial passage means of upper and lower pumping sections are fixedly mounted on the common support frame so as to be rotated simultaneously from one driving source. Therefore, by suitably selecting the relative positioning between the upper and lower fluid passage means 247 and 447 or between the upper and lower nozzle members 239 and 439, a relative adjustment of pumping action in both sections 200 and 400 becomes possible to obtain good results with the apparatus. For example, upper and lower fluid passage means or upper and lower nozzle members may be so positioned with respect to each other that, while the exhausting cycle of operation is performed in the upper section, the lower pumping section does not execute the suction or intake cycle of operation. Further, with respect to the embodiment illustrated in FIGS. 23 and 24, by feeding different kind of liquids into upper and lower pumping sections 200 and 400 through separate supply conduit 239 and 439 respectively, pump operations of different delivery characteristics are carried out in each section. For example, by supplying liquid of greater specific gravity into the upper pump section, good results in exhaust operation can be obtained with the multi-pumping apparatus working as a vacuum pump.

With respect to a multi-stage pumping apparatus according to the present invention, a construction wherein fluid passage means in each pumping section is adjustable for altering the rotational speed can also be possible and such construction enables the adaptation of exhaust performance to the application in which it is used.

If electric power to the motor is cut off due to unexpected causes during operation of the pumping apparatus according to this invetion, pump action thereof is naturally stopped and it is very likely that reversal of flow will occur in the apparatus. In order to prevent such reverse flow, it is necessary to arrange a suitable means for checking contraflow at least in an intake line or system communicated to the pumping apparatus, if not within the apparatus. With regard to the various embodiments of the present invention (except for those having the check valve or trap means incorporated therein), it is preferable to connect an appropriate reverse flow checking device to the inlet port of the present pumping apparatus. Or more specifically, it is highly desirable to provide a counter-flow checking means which blocks reverse flow of liquid only when the pump operation is caused to stop and which does not interfere with the intake performance of the apparatus during normal operation thereof.

Figure 25:
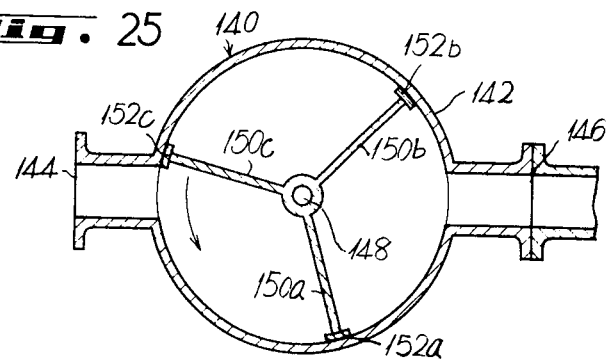
FIG. 25 is a horizontal cross sectional view of a flow restricting means which may be suitably connected to the inlet port of the pumping apparatus for restricting a reversed flow of fluid therethrough.

In FIG. 25, there is illustrated one preferred form of such flow checking means. In the drawing, a reverse-flow controlling device 140 comprises a cylindrical member 142 provided with diametrically opposed inlet port 144 and outlet port 146. A center shaft 143 is located extending longitudinally into the cylindrical member and is connected in interlocking relation with a driving source i.e. the drive motor (not shown) of the pumping apparatus for rotation thereof during the pump operation. The three vanes or blades 150a, 150b and 150c of a predetermined width are mounted on the shaft spaced equal angular distance (120° in the illustrated exemplification) with respect to each other. These vanes extend substantially the radius of cylinder 142 and are provided at their radially outer ends with contact shoes 152a, 152b and 152c for assuring close sliding contact with the inner surrounding wall of the cylinder. Thus, vanes 150a, 150b and 150c effectively divide the available space in the cylinder 142 into three sections.

With above arrangement of the check device, reverse flow of fluid is prevented in the following way. During normal operation of the pumping device, vanes 150a, 150b and 150c are simultaneously rotated in counterclockwise direction by the drive motor (not shown) of the apparatus and fluid (or air) is delivered from inlet port 144 to outlet port 146 through the cylindrical space. As the motor stops, the pump operation comes to a standstill and air under pressure (the atmosphere) tends to reverse through outlet port 146 into cylinder member 142. But at this point all vanes 150a, 150b and 150c have also been brought to a halt with vanes 150a and 150b completely intercepting the flow path in cylinder 142. Thus, the reverse flow of air is blocked by two resting blades 150a and 150b. During this period, the fluid pressure acts on the upstream side of the resting blades but fails to cause the rotation thereof even if shaft 148 is free of any restraining force since both blades have the same surface area. Contact shoes 152a and 152b assist in assuring a complete blockade of the flow path within cylinder 142.

In the illustrated embodiment, three vanes are arranged within the cylinder. However, more than three vanes may suitably be used for the above purpose only if they are arranged around the shaft with equal angular distance between adjacent vanes.

The shoes are also provided to augment leakage-proof sliding contact between the vane ends and the inner surrounding wall of the cylinder member, but they can be dispensed with since it is possible to maintain fluid-tight engagement therebetween without the contact shoes. The illustrated device for checking reverse flow has been described as being arranged in a vacuum system without intending to limit its use thereto. For example, it can also be utilized in various compression and suction system applications. The illustrated device provides a simple means for positively as well automatically restricting the reserve flow of fluid.

In general, pumping apparatus in accordance with the present invention can operate not only as a vacuum pump but as a degassing pump or a compressor with entirely satisfactory results. In addition, the present invention provides a compact and versatile pumping apparatus with fewer friction parts which assures an extended life of operation at higher rotational speed. Further, the present apparatus is capable of handling vapor containing various chemical ingredients.

While only a few illustrative embodiments of the invention have been described in detail it should be obvious that there are numerous variations and modifications within the scope of this invention. The invention is more particularly defined in the appended claims.

What I claim is:

1. A pumping apparatus for gases comprising:
a fixed housing;
a rotatably mounted circular fluid passage assembly located within the fixed housing having a centrally disposed circular opening and an outer peripheral outlet opening;
a plurality of involutely shaped passages extending from the centrally disposed circular inlet opening of the fluid passage assembly to the peripheral outer outlet opening of the fluid passage assembly and juxtaposedly arranged within the rotatably mounted circular passage assembly to provide the entire centrally disposed circular opening of the fluid passage assembly with adjacent inlet passages;
a liquid supply pipe axially disposed within the central circular opening in the rotatably mounted fluid passage assembly;
discharge nozzle means formed on the liquid supply pipe and arranged in alignment with the inlet opening of the rotating fluid passage assembly;
means to rotate the rotatably mounted circular fluid passage assembly;
a low-pressure air chamber within the housing in communication with the rotating fluid passage inlet opening; and
a high-pressure air chamber within the housing in communication with the outlet opening of the rotating fluid passage.

2. A pumping apparatus according to claim 1 wherein said involute passages are formed by involutely extending walls having a uniform thickness, said walls being arranged in a spaced relationship at angularly regular intervals corresponding to the width of the passages.

3. A pumping apparatus according to claim 1 wherein each of said involute passages has a rectangular cross section.

4. A pumping apparatus according to claim 1 wherein the outlet of each of said involute passages has a smaller cross-sectional area as compared with that of the inlet thereof.

5. A pumping apparatus according to claim 1 further comprising a plurality of passage assemblies vertically arranged in different horizontal planes.

References Cited
UNITED STATES PATENTS

| | | | |
|---|---|---|---|
| 1,101,929 | 6/1914 | Hayes | 417—72 |
| 1,354,340 | 9/1920 | Rosenhagen | 417—72 |
| 1,457,536 | 6/1923 | Maclean | 417—72 X |

ROBERT M. WALKER, Primary Examiner